(12) United States Patent
Brashar

(10) Patent No.: US 11,531,117 B1
(45) Date of Patent: Dec. 20, 2022

(54) JITTER TRACKING ANTI-SPOOFING ALGORITHM

(71) Applicant: National Technology & Engineering Solutions of Sandia, LLC, Albuquerque, NM (US)

(72) Inventor: Connor Brashar, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 0 days.

(21) Appl. No.: 17/405,478

(22) Filed: Aug. 18, 2021

Related U.S. Application Data

(60) Provisional application No. 63/069,908, filed on Aug. 25, 2020.

(51) Int. Cl.
*G01S 19/21* (2010.01)
*G01S 19/47* (2010.01)

(52) U.S. Cl.
CPC ............ *G01S 19/215* (2013.01); *G01S 19/47* (2013.01)

(58) Field of Classification Search
CPC .................................................. G01S 19/215
See application file for complete search history.

(56) References Cited

U.S. PATENT DOCUMENTS

| | | | | |
|---|---|---|---|---|
| 5,557,284 | A * | 9/1996 | Hartman | G01S 19/215 342/357.29 |
| 7,952,519 | B1 * | 5/2011 | Nielsen | G01S 19/215 342/357.59 |
| 10,545,246 | B1 * | 1/2020 | Johnston | G01S 19/21 |
| 2017/0090036 | A1 * | 3/2017 | Zalewski | G01S 19/215 |
| 2018/0196141 | A1 * | 7/2018 | Dickerson | G01S 19/215 |

OTHER PUBLICATIONS

Jones, M., "Army pseudolites: What, why and how?", GPS World, https://www.gpsworld.com/amny-pseudolites-what-why-and-how/. Aug. 9, 2017, 12 pages.

Langley, R. B., "The Integrity of GPS", GPS World (Mar. 1999), pp. 60-63.

\* cited by examiner

*Primary Examiner* — Cassi J Galt
(74) *Attorney, Agent, or Firm* — Mark A. Dodd

(57) ABSTRACT

A system and method to distinguish spoofing signals from true GNSS signals is disclosed. One aspect of the present invention combines measuring GNSS carrier signals with measuring jitter in a vehicle's position via a low-cost inertial measurement unit (IMU) to distinguish spoofing signals from true GNSS signals. The present invention employs natural and/or artificial jitter of a vehicle, that, when combined with a tightly coupled inertial navigation system (INS), allows the receiver to distinguish the spoofing GNSS signal from the true GNSS signal. This spoofer survivability algorithm may be implemented, for example, in the software of a GNSS (or GPS) navigation system.

17 Claims, 9 Drawing Sheets

JITTER TRACKING ANTI-SPOOFING ALGORITHM

RELATED APPLICATIONS

This application claims priority to U.S. Provisional Application No. 63/069,908, filed on Aug. 25, 2020, and entitled JITTER TRACKING ANTI-SPOOFING ALGORITHM, the entirety of which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

TECHNICAL FIELD

The present invention relates to a method for identifying true and falsified Global Navigation Satellite Systems (GNSS) or Global Positioning System (GPS) signals that permits continued navigation based upon the true signals.

BACKGROUND

Global Navigation Satellite Systems (GNSS) provide space-borne signals that may be received by any civilian or military user around the world and provide accurate Position, Navigation, and Timing. These GNSS signals are used in Safety of Life (SoL) applications for both civilian and military settings every day. However, these signals are vulnerable to attack, including jamming (overpowering GNSS signals so that a receiver can no longer operate) and spoofing (making a GNSS receiver calculate a false position). One approach to spoofing involves replicating GNSS signals, and once these replicated signals are accepted by the GNSS receiver, falsifying the signals, thereby affecting the apparent location determined by the receiver.

GNSS has been used at every level of both civilian and military applications throughout the world—including aerial drones, autonomous vehicles, infrastructure monitoring and support, electrical systems timing, stock exchanges, and cellular telephones. The use of GNSS technologies increases daily. GNSS signals are weak, well below the noise floor, and civilian GNSS signals are unauthenticated, making them very easy to jam or deceive through common deception practices such as spoofing, which may include meaconing. This means that the adversary need not hack encryption on a GNSS system in order to carry out an effective attack against the system.

New signals, such as the US Global Positioning System (GPS) L5 civilian signal and the military's M-code encoded signals are very robust against denied environments. Further, the field of spoofing detection has become quite mature, with innovations including various integrity monitoring algorithms, for example, Receiver Autonomous Integrity Monitoring (RAIM), and other spoofing detection algorithms ensuring that if spoofing occurs, users can be appraised of it. See R. B. Langley, "The Integrity of GPS," GPS World, vol. 10, no. 3, pp. 60-63 (1999), the contents of which are incorporated herein by reference, for a discussion of RAIM. But spoofing remains a vulnerability in all systems because little has been done in the way of spoofing protection. For example, when RAIM detects spoofing, most systems employing RAIM simply stop processing the GNSS signal and attempt to navigate off inertial sensors, thereby degrading the capability of modern navigation systems.

GNSS offers the only global coverage in the world with an absolute reference frame at sub-meter level accuracy and synchronized coordinated universal time (UTC) timing anywhere on Earth. In addition, GNSS offers the most low-cost solution to navigation systems on the planet to the average user. Therefore, a need exists to protect GNSS systems from spoofing attacks.

SUMMARY

One aspect of the present invention combines measuring characteristics of GNSS carrier signals with measuring the jitter in a vehicle's position via a low-cost inertial measurement unit (IMU) to distinguish spoofing signals from true GNSS signals in the carrier-tracking of a receiver. This combination allows automated systems the ability to continue to navigate, even in the presence of intelligent, directed spoofing. Specifically, the present invention employs natural and/or artificial jitter of a vehicle's position, that, when combined with a tightly coupled inertial navigation system (INS), would allow the receiver to distinguish the spoofing GNSS signal from the true GNSS signal. This spoofer survivability algorithm may be implemented, for example, in the software of a GNSS (or GPS) navigation system, which is simplified in that many GNSS navigation systems now include a built-in INS.

Jitter in a vehicle's position may take two forms—natural and artificial. Natural jitter may be caused, for example, by the motion of the vehicle as it passes over terrain, especially bumps in the terrain, is buffeted by wind, or by the vibration of the vehicle's engine that is transmitted to the entire vehicle. Artificial jitter may be caused, for example, by altering the speed or altitude of the vehicle, e.g., intentionally changing the power output by the vehicle's drivetrain or by altering the vehicle's control surfaces, or by oscillating the location of the GNSS antenna. By monitoring the jitter of a vehicle, the apparent motions of both true and falsified GNSS signals across the pseudo-range carrier and Doppler measurements can be tested against the known truth of the INS, thereby generating a reliable test that can identify the falsified GNSS signal. Because the jitter in a vehicle's position can be sufficiently small for even low-cost IMUs to detect, this jitter may be undetectable or unaccountable by even the most advanced spoofer systems' vehicle tracking. This allows an autonomous vehicle continued, reliable navigation even in the presence of a falsified GNSS signal.

Traditionally, Advanced Receiver Autonomous Integrity Monitoring (ARAIM) methodologies exclude individual failed signals by comparing a single incident GNSS carrier signal to four or five true GNSS signals. However, in certain scenarios, a full constellation of GNSS signals is presented to a receiver that appear true but are actually false. Therefore, various aspects of the present invention seek to detect, isolate, and identify multiple GNSS signals as falling into one of the following categories: a true signal transmitted by a GNSS satellite, a falsified signal transmitted by a signal transmitter such as a GNSS spoofer or repeater, or a multipath signal that imposes accidental interference into the system. Various embodiments of the present invention therefore rely upon a modified correlator architecture to traditional GNSS receivers that first tracks all signals purporting to be GNSS signals, organizes signals according to purported position solution, and then leverages some form of detection to identify which are true, falsified, or multipath signals.

In at least one embodiment of the present invention, a method comprises the steps of detecting a plurality of Global Navigation Satellite System (GNSS) carrier signals, temporally tracking characteristics of the plurality of GNSS carrier signals for dither (thereby creating dither data), comparing the dither data, identifying at least one falsified GNSS carrier signal based upon a degree of correlation of the dither data, and determining navigation information based on the plurality of GNSS carrier signals not identified as falsified GNSS carrier signals.

In other embodiments of the present invention, when the dither data from the characteristics of two or more of the plurality of GNSS carrier signals are highly correlated, the corresponding two or more of the plurality of GNSS carrier signals are identified as falsified GNSS carrier signals; the method further comprises the steps of detecting jitter of a vehicle, temporally tracking the jitter of the vehicle (thereby creating jitter data), comparing dither data with jitter data, and identifying at least one falsified GNSS carrier signal based upon a degree of correlation of the dither data and the jitter data (when the dither data from the characteristics of one of the plurality of GNSS carrier signals is not highly correlated with the jitter data, the corresponding one of the plurality of GNSS carrier signals is identified as the falsified GNSS carrier signal); the method further comprises the step of introducing artificial jitter to the vehicle (the step of introducing artificial jitter prior to the step of detecting jitter); and the step of introducing artificial jitter includes at least one of changing an engine speed of the vehicle, changing a speed of the vehicle, changing an altitude of the vehicle, changing a roll of the vehicle, changing a pitch of the vehicle, changing a yaw of the vehicle, changing a flight control surface of the vehicle, or changing a location or attitude of an antenna of a receiver used in the step of detecting a plurality of GNSS carrier signals with respect to a vehicle coordinate frame.

In still other embodiments of the present invention, the method further comprises the steps of temporally tracking the plurality of GNSS carrier signals (thereby creating signal source data), filtering the signal source data to remove multipath signals, binning the remaining signal source data into signal sets, and determining one or more signal sets that produce a corresponding internally consistent position according to a cost function based on a consistency of a corresponding position (each one of the determined signal sets corresponding to falsified GNSS carrier signals or true satellite-transmitted GNSS carrier signals), and further processing of each of the one or more signal sets that produce a corresponding internally consistent position identifies which internally consistent position is based upon falsified GNSS carrier signals.

In yet other embodiments of the present invention, the method further comprises the steps of estimating expected values for one or more characteristics of the plurality of GNSS carrier signals (thereby creating expected data), detecting one or more actual characteristics of the plurality of GNSS carrier signals (thereby creating actual data), comparing the expected data with the actual data, and identifying at least one falsified GNSS carrier signal based upon a degree of correlation of the expected data with the actual data (when the actual data is not highly correlated with a corresponding one of the expected data, the one of the plurality of GNSS carrier signals corresponding to the actual data that is not highly correlated is identified as the falsified GNSS carrier signal); and the method further comprises the steps of determining a location of a transmitter corresponding to each of the at least one falsified GNSS carrier signal, temporally tracking the location of the transmitter corresponding to each of the at least one falsified GNSS carrier signal, identifying, as a stationary transmitter, each transmitter whose location does not temporally change, identifying, as a stationary falsified GNSS carrier signal, each of the at least one falsified GNSS carrier signal corresponding to a stationary transmitter, and determining navigation information based on each stationary falsified GNSS carrier signal.

In at least one embodiment of the present invention, a system comprises an antenna for detecting a plurality of Global Navigation Satellite System (GNSS) carrier signals, at least one processor, and memory that stores instructions that, when executed by the at least one processor, cause the at least one processor to perform acts including temporally tracking characteristics of the plurality of GNSS carrier signals for dither (thereby creating dither data), comparing the dither data, identifying at least one falsified GNSS carrier signal based upon a degree of correlation of the dither data, and determining navigation information based on the plurality of GNSS carrier signals not identified as falsified GNSS carrier signals.

In other embodiments of the present invention, when the dither data from the characteristics of two or more of the plurality of GNSS carrier signals are highly correlated, the corresponding two or more of the plurality of GNSS carrier signals are identified as falsified GNSS carrier signals; the memory stores instructions that, when executed by the at least one processor, cause the at least one processor to perform further acts including detecting jitter of a vehicle, the vehicle including the antenna, temporally tracking the jitter of the vehicle (thereby creating jitter data), comparing dither data with jitter data, and identifying at least one falsified GNSS carrier signal based upon a degree of correlation of the dither data and the jitter data (when the dither data from the characteristics of one of the plurality of GNSS carrier signals is not highly correlated with the jitter data, the corresponding one of the plurality of GNSS carrier signals is identified as the falsified GNSS carrier signal); and the system further comprises means for introducing artificial jitter to the vehicle (the artificial jitter including at least one of changing an engine speed of the vehicle, changing a speed of the vehicle, changing an altitude of the vehicle, changing a roll of the vehicle, changing a pitch of the vehicle, changing a yaw of the vehicle, changing a flight control surface of the vehicle, or changing a location or attitude of the antenna with respect to a vehicle coordinate frame).

In still other embodiments of the present invention, the memory stores instructions that, when executed by the at least one processor, cause the at least one processor to perform further acts including temporally tracking the plurality of GNSS carrier signals (thereby creating signal source data), filtering the signal source data to remove multipath signals, binning the remaining signal source data into signal sets, and determining one or more signal sets that produce a corresponding internally consistent position according to a cost function based on a consistency of a corresponding position (each one of the determined signal sets corresponds to falsified GNSS carrier signals or true satellite-transmitted GNSS carrier signals), and further processing of each of the one or more signal sets that produce a corresponding internally consistent position identifies which internally consistent position is based upon falsified GNSS carrier signals.

In still other embodiments of the present invention, the memory stores instructions that, when executed by the at least one processor, cause the at least one processor to perform further acts including determining a location of a transmitter corresponding to each of the at least one falsified GNSS carrier signal, temporally tracking the location of the transmitter corresponding to each of the at least one falsified GNSS carrier signal, identifying, as a stationary transmitter, each transmitter whose location does not temporally change, identifying, as a stationary falsified GNSS carrier signal, each of the at least one falsified GNSS carrier signal corresponding to a stationary transmitter, and determining navigation information based on each stationary falsified GNSS carrier signal.

In at least one embodiment of the present invention, a computer-readable storage device comprises instructions that, when executed by at least one processor, cause the at least one processor to perform acts comprising detecting a plurality of Global Navigation Satellite System (GNSS) carrier signals, temporally tracking characteristics of the plurality of GNSS carrier signals for dither (thereby creating dither data), comparing the dither data, identifying at least one falsified GNSS carrier signals based upon a degree of correlation of the dither data, and determining navigation information based on the plurality of GNSS carrier signals not identified as falsified GNSS carrier signals.

In other embodiments of the present invention, when the dither data from the characteristics of two or more of the plurality of GNSS carrier signals are highly correlated, the corresponding two or more of the plurality of GNSS carrier signals are identified as falsified GNSS carrier signals; the acts further comprise detecting jitter of a vehicle, temporally tracking the jitter of the vehicle (thereby creating jitter data), comparing dither data with jitter data, and identifying the at least one falsified GNSS carrier signal based upon a degree of correlation of the dither data and the jitter data (when the dither data from the characteristics of one of the plurality of GNSS carrier signals is not highly correlated with the jitter data, the corresponding one of the plurality of GNSS carrier signals is identified as the falsified GNSS carrier signal); and the acts further comprise introducing artificial jitter to the vehicle (the artificial jitter including at least one of changing an engine speed of the vehicle, changing a speed of the vehicle, changing an altitude of the vehicle, changing a roll of the vehicle, changing a pitch of the vehicle, changing a yaw of the vehicle, changing a flight control surface of the vehicle, or changing a location or attitude of an antenna of a receiver used in the step of detecting a plurality of GNSS carrier signals with respect to a vehicle coordinate frame).

In still other embodiments of the present invention, the acts further comprise temporally tracking the plurality of GNSS carrier signals (thereby creating signal source data), filtering the signal source data to remove multipath signals, binning the remaining signal source data into signal sets, and determining one or more signal sets that produce a corresponding internally consistent position (each one of the determined signal sets corresponds to falsified GNSS carrier signals or true satellite-transmitted GNSS carrier signals according to a cost function based on a consistency of a corresponding position), and further processing of each of the one or more signal sets that produce a corresponding internally consistent position identifies which internally consistent position is based upon falsified GNSS carrier signals.

In still other embodiments of the present invention, the acts further comprise determining a location of a transmitter corresponding to each of the at least one falsified GNSS carrier signal, temporally tracking the location of the transmitter corresponding to each of the at least one falsified GNSS carrier signal, identifying, as a stationary transmitter, each transmitter whose location does not temporally change, identifying, as a stationary falsified GNSS carrier signal, each of the at least one falsified GNSS carrier signal corresponding to a stationary transmitter, and determining navigation information based on each stationary falsified GNSS carrier signal.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings. The drawings are not to scale and are intended only to illustrate the elements of various embodiments of the present invention.

DETAILED DESCRIPTION

Definitions

The term "carrier signal" means a signal having a format that corresponds to a GNSS signal.

The term "receiver" means the GNSS receiver on-board the vehicle.

The term "spoofer" means the transmitter trying to deceive the receiver.

The term "vehicle" means the vehicle with the receiver that is the target of the spoofing.

The term "satellite" means the GNSS satellite.

The term "jitter" means the combined motion caused, for example, by engine noise (e.g., variable engine speed), wind, arbitrary sub-decimeter effects, and delay in spoofer processing of the vehicle motion, which form unobservable motions in the receiver to a spoofer device.

The phrase "characteristics of a GNSS signal" means the frequency and/or phase of a GNSS signal.

Operating Theory

Figure 1:
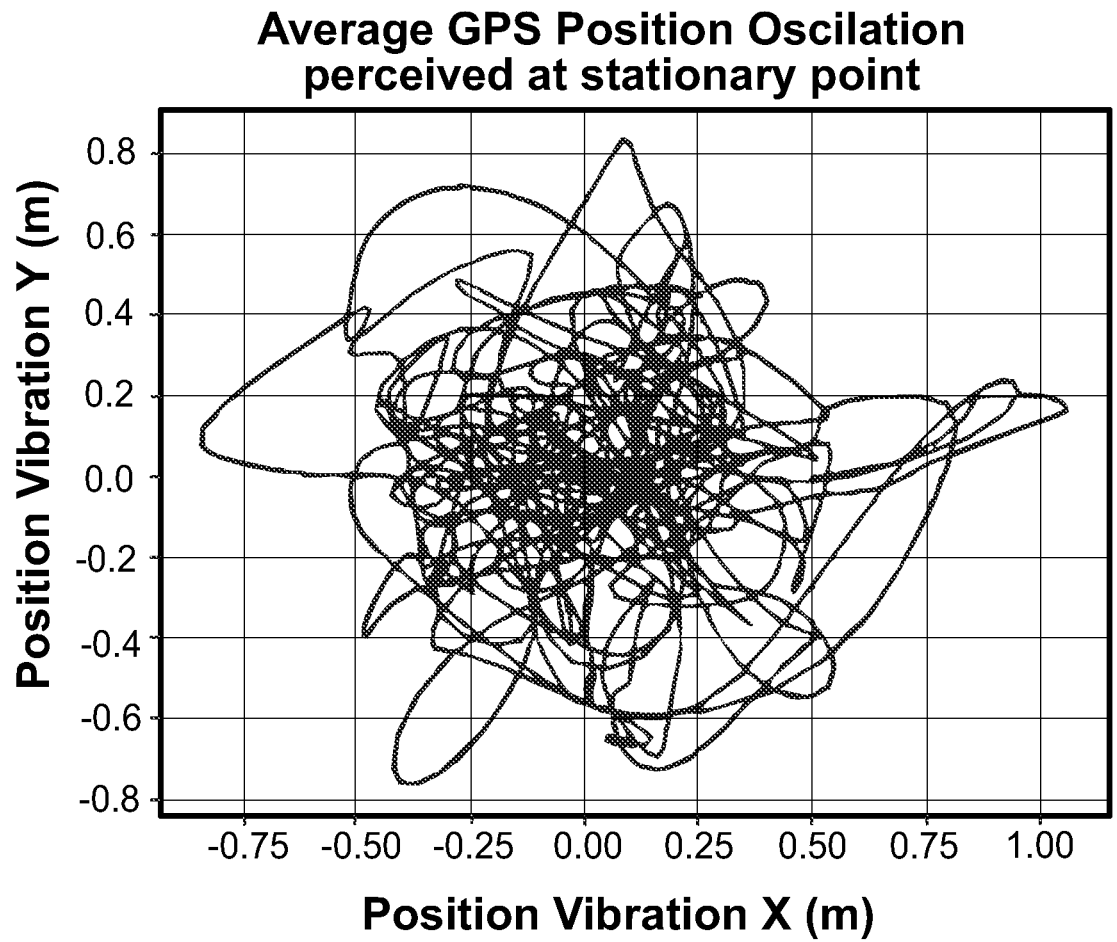
FIG. 1 illustrates the natural dither over time expected in a GNSS signal.

In various embodiments of the present invention, a spoofer survivability algorithm monitors the dither in the characteristics of a GNSS signal of each satellite over time. The characteristics of a true GNSS signal dither over time as a function of many elements, including ionospheric effects and tropospheric effects. This dither is illustrated in FIG. 1 for a stationary point, which shows the perceived position varies by more than approximately ±0.75 m.

Figure 2:
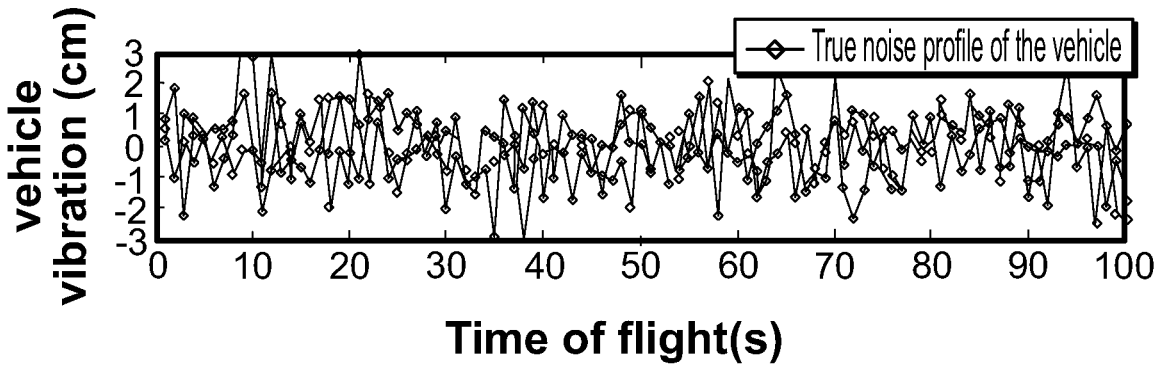
FIG. 2 illustrates the exemplary three-dimensional (3D) jitter that might be expected to be encountered by one or more embodiments of the present invention.

The characteristics of a true GNSS signal may also dither over time due to natural or artificial vehicle jitter. FIG. 2 illustrates exemplary vehicle jitter in three-dimensions (3D). This exemplary vehicle jitter could be measured, for example, by the vehicle's onboard IMU. This jitter in the vehicle's position resolves itself as shifts in the pseudo-range position and Doppler shifts along the vector of the vehicle to the satellite. A falsified GNSS signal may try to mimic the dithering of the characteristics of a true GNSS signal due to ionosphere and troposphere effects. However, the spoofer survivability algorithm will observe all dithering in the characteristics of a falsified GNSS signal as a function of vehicle motion along-track to the spoofer, as opposed to along-track to the GNSS transmitting satellite.

Figure 3:
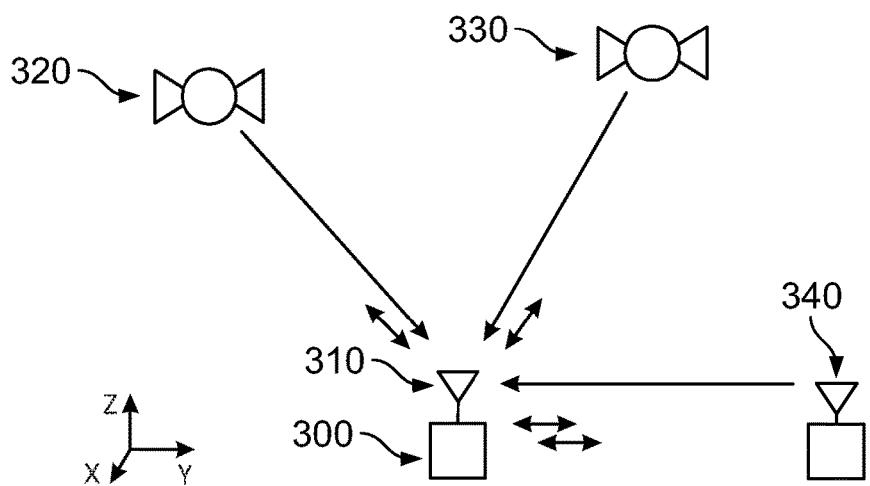
FIG. 3 illustrates the relative locations of a vehicle with a receiver in accordance with one or more embodiments of the present invention, relative to a pair of GNSS satellites and a spoofer in an exemplary operational environment.
Figure 4:
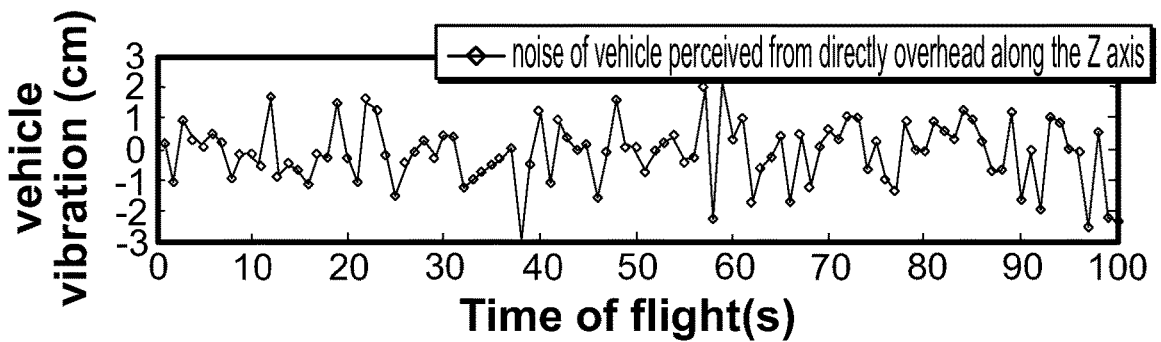
FIGS. 4-6 illustrate the jitter of a vehicle with a receiver in accordance with one or more embodiments of the present invention along-track to three different positions.
Figure 5:
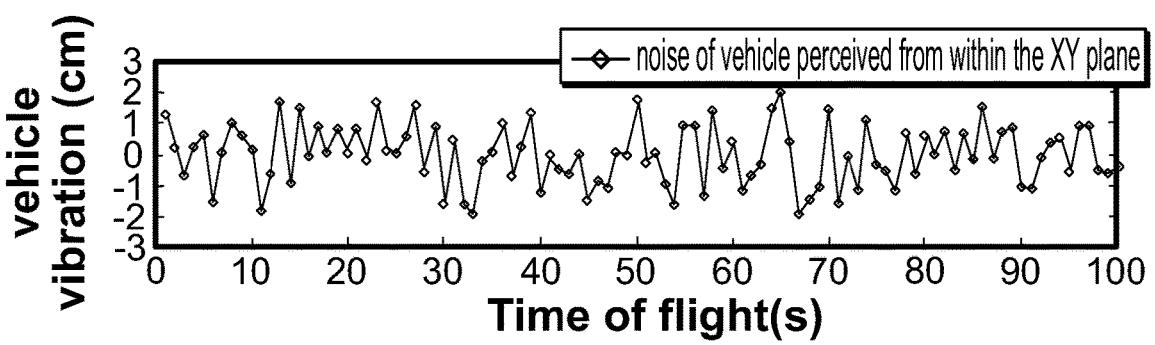
Figure 6:
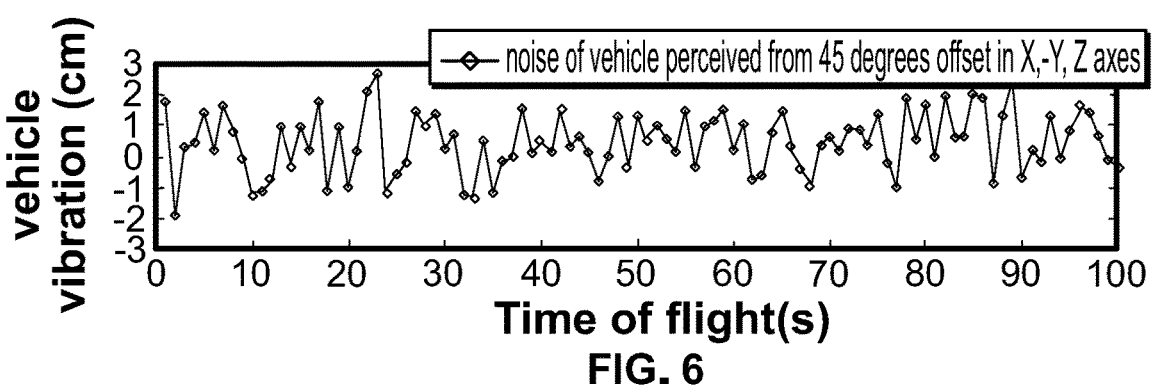

FIG. 3 illustrates the relative locations of a vehicle 300 with a receiver 310, a pair of GNSS satellites 320, 330, and a spoofer 340 in an exemplary operational environment. FIG. 4 illustrates the jitter of the vehicle 300 along-track with the satellite 320, assuming it is directly over the vehicle 300 in the Z-direction. FIG. 5 illustrates the jitter of the vehicle 300 along-track with the spoofer 340, if the spoofer 340 is in the same X-Y plane as the vehicle 300 and along a line 45° from the X axis toward the Y axis. FIG. 6 illustrates the jitter of the vehicle 300 along-track with the spoofer 340, if the spoofer 340 is along a line 45° from the X axis toward the —Y axis, and at a 45° angle above the X-Y plane toward the Z axis relative to the vehicle 300, as might be the case if the vehicle 300 is ground-based while the spoofer 340 is airborne. Note that the perceived range shifts only as a function of all amplitude—for FIGS. 4-6, all other sources of motion (generic motion of the vehicle 300, the satellite 320, and the spoofer 340) have been removed.

In a spoofer scenario, the vehicle 300 with the receiver 310, the GNSS satellites 320, 330, and the spoofer 340, may, and likely are, all moving. The purpose of the receiver 310 in the vehicle 300 is to disambiguate exact range between the vehicle 300 and the GNSS satellites 320, 330 as the GNSS satellites 320, 330 transmit their precise location. If the receiver 310 disambiguates range with respect to four GNSS satellites, the receiver 310 can determine its precise location. Thus, the receiver 310 seeks to track its own motion and position (through various sensors) as well as that of the GNSS satellites 320, 330. When general satellite and receiver positions are known and removed, the remaining signal left is the unknown, that is, a mixture of measurement noise and the jitter of the signal as a function of minute motions of the vehicle 300, and thus the receiver 310.

The effect of jitter of the vehicle 300 and receiver 310 on the effective pseudo-range and Doppler from the falsified GNSS signals will be the same for all falsified GNSS signals in every channel, regardless of the professed satellite position. In this way, there is an indicator for which GNSS signals are falsified and which are true. The dithering of the characteristics of every falsified GNSS signal should correlate with one another, and be time delayed with respect to the true GNSS signals due to the time it takes the spoofer 340 to generate the falsified GNSS signals based on the true GNSS signals. In contrast, the true GNSS signals from GNSS satellites 320, 330 should not correlate with one another due to the respective geometries of the vehicle 300 and corresponding receiver 310 position jitter along-track to the GNSS satellites 320, 330. The true GNSS signals may still correlate with one another from atmospheric effects, but not in the same way. Further, carrier-phase differential GNSS systems can remove these atmospheric effects should they be present.

The spoofer 340 transmits a very specific signal, which looks to the receiver 310 almost the same as that transmitted by the GNSS satellites 320, 330. The spoofer 340 tracks the vehicle 300, with receiver 310, in order to create this signal, but cannot track two elements of the position of the vehicle 300 and receiver 310. First, the spoofer 340 cannot accurately track sub-decimeter accurate position changes in the vehicle 300 with receiver 310 that comprises the true jitter of the vehicle 300 and receiver 310. The best the spoofer 340 can do is determine the general motion and position of the vehicle 300 with receiver 310, it will not be able to accurately detect minor changes, i.e., the jitter. Second, the spoofer 340 cannot accurately track the real-time motion of the vehicle 300 with receiver 310, as the signal from the spoofer 340 will include some delay due to receiving information on the position of the vehicle 300 with receiver 310, processing of the received position information, and transmitting the spoofed signal.

Jitter exists for the vehicle 300, and thus the receiver 310, and it is real motion. By being indistinguishable by the spoofer 340, this means that the jitter of the vehicle 300 and the receiver 310 will be different along-track between for the GNSS satellite 320, 330 than it will along-track for the spoofer 340. This difference is a geometric difference between the various angles of arrival. If the spoofer 340 is somehow in-line between the receiver 310 and one of the GNSS satellites 320, 330, there will be no difference. If the along-track lines vary by 45°, there will be a 45° angular difference on that jitter, such as that illustrated in FIGS. 4-6.

Stated differently, if a receiver 310 knows its jitter, for example, through inertial sensor measurement, gimballed antennas, or carrier-phase GPS, the receiver 310 can compare this jitter between different signals and derive the angle of arrival between respective signals. This is because the jitter between the vehicle 300 with receiver 310 and any point is the projection of this known 3D jitter onto the line between vehicle 300 and that point.

Figure 7:
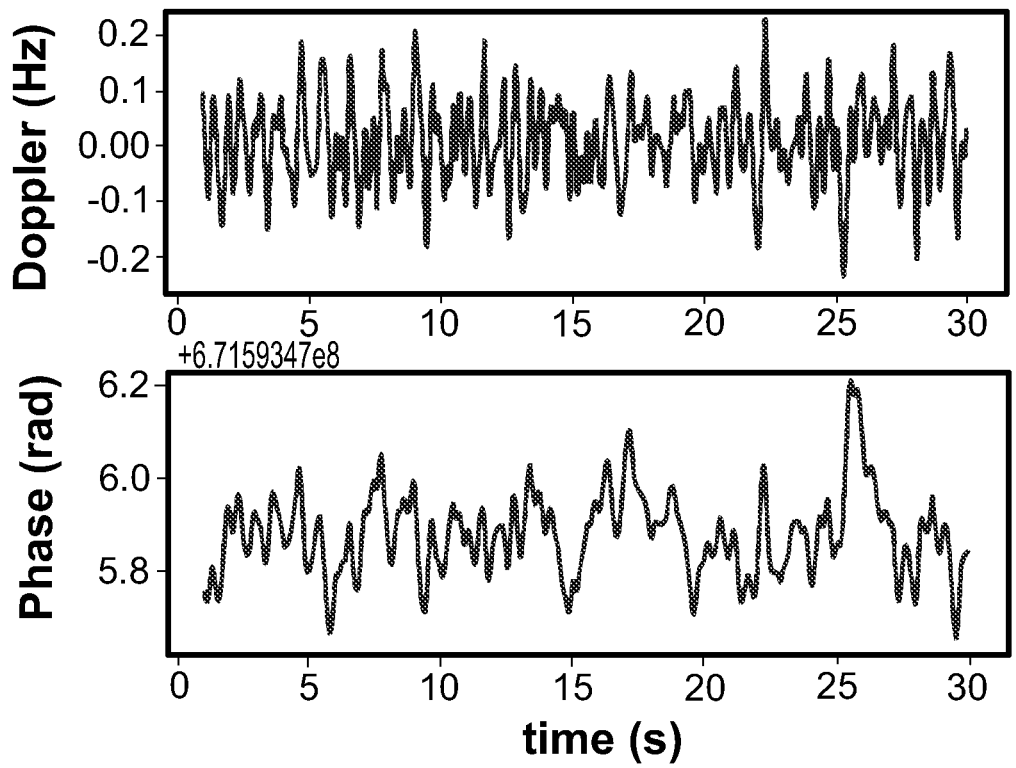
FIGS. 7-8 illustrate the Doppler and phase shifts of a GNSS signal detected by a receiver in accordance with one or more embodiments of the present invention when the source of the GNSS signals is an overhead satellite (FIG. 7) and a ground level spoofer (FIG. 8).
Figure 8:
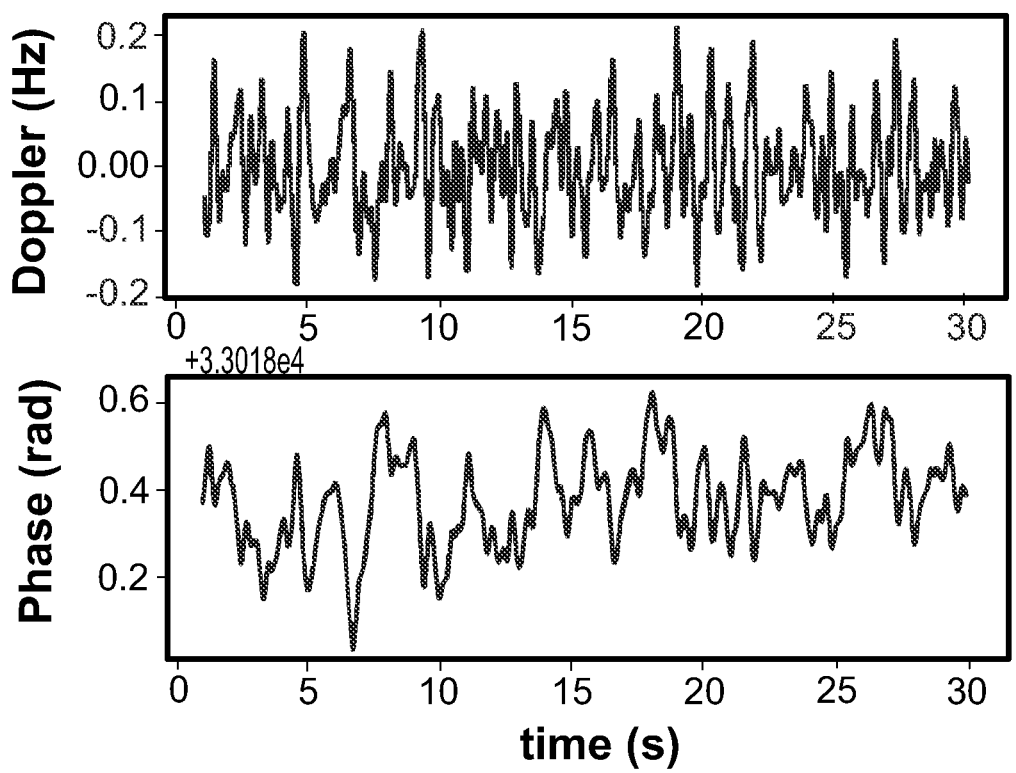

This along track jitter is illustrated in FIGS. 7 and 8, which show the along-track, i.e., trajectory projections, between the vehicle 300 with receiver 310 and the satellite 320, which is directly over the vehicle 300 in the Z-direction (FIG. 3), and between the vehicle 300 with receiver 310 and the spoofer 340, if the spoofer 340 is in the same X-Y plane as the vehicle 300 and along a line 45° from the X axis toward the Y axis (FIG. 4). FIGS. 7 and 8 illustrate the actual perception of this jitter as the receiver 310 does not experience jitter directly—instead, the receiver 310 experiences it through Doppler and phase shifts. The differences between FIGS. 7 and 8 reflect the jitter "signature" that is used to disambiguate angle of arrival and form a solution as to the precise location of the vehicle 300 with receiver 310.

Figure 9:
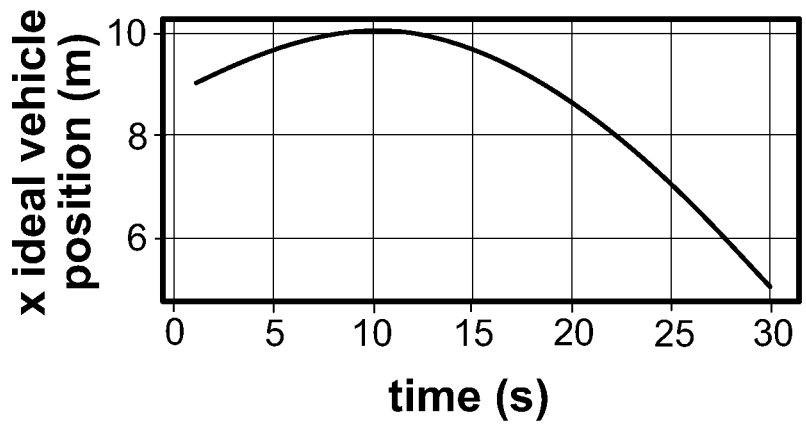
FIGS. 9-14 illustrate the position and jitter of a vehicle in motion with a receiver in accordance with one or more embodiments of the present invention.
Figure 10:
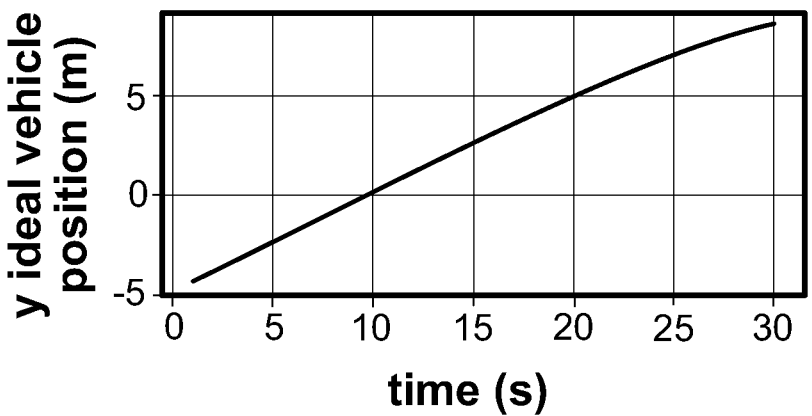
Figure 11:
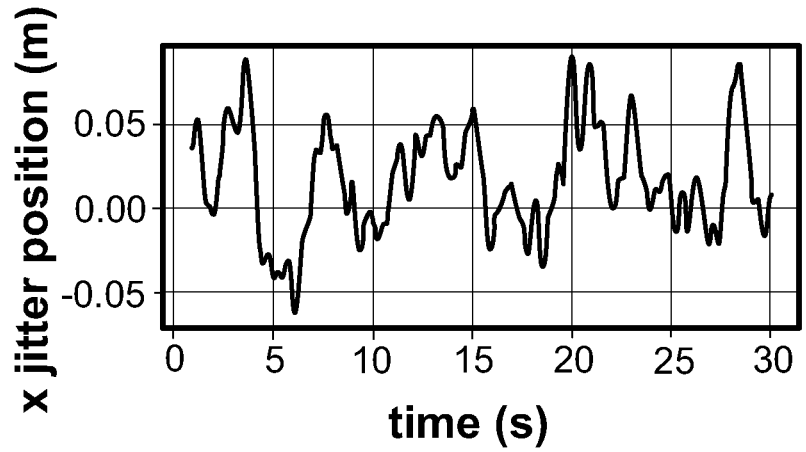
Figure 12:
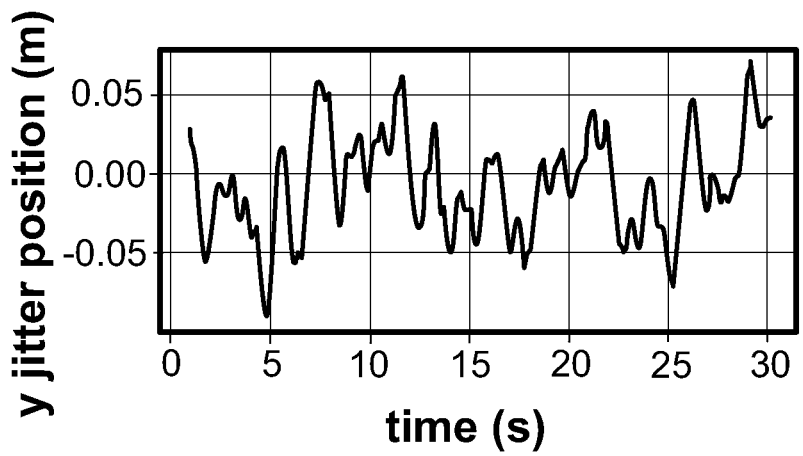
Figure 13:
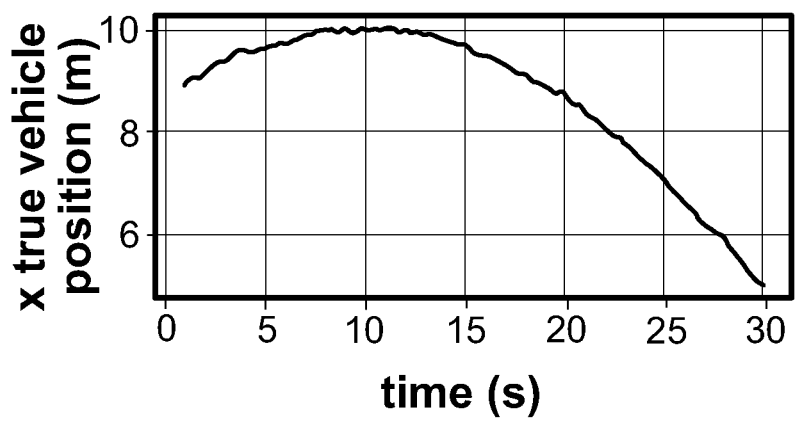
Figure 14:
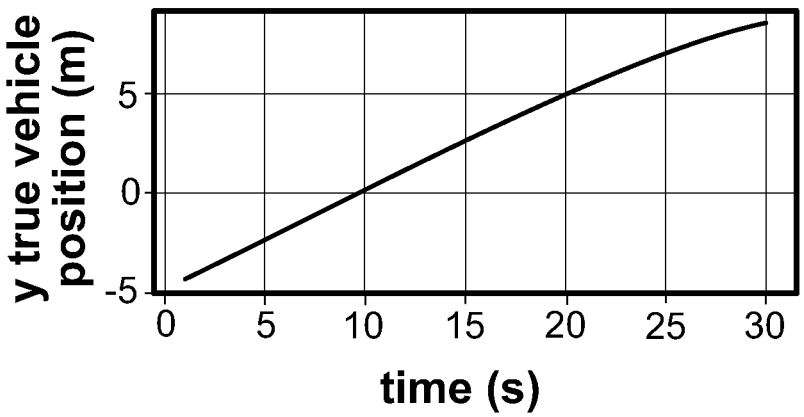

FIGS. 9-14 illustrate an example of the vehicle 300 in motion. As illustrated in FIGS. 9 and 10, the vehicle has an ideal position in X and Y, respectively. FIGS. 11 and 12 illustrate the jitter in X and Y, respectively, of the position of the vehicle 300 in motion, as would be measured, for example, by an inertial sensor, gimballed antennas, or carrier-phase GPS. FIGS. 13 and 14 illustrate the true position of the vehicle 300 in X and Y, respectively, and is the sum of the ideal position (illustrated in FIGS. 9 and 10) and the jitter (illustrated in FIGS. 11 and 12). Any signal from the spoofer 340 would indicate a position like the ideal position illustrated in FIGS. 9 and 10, but delayed in time. This is because the spoofer 340 would not be able to detect the jitter illustrated in FIGS. 11 and 12, and would be delayed primarily due to processing by the spoofer 340, though delay due to round trip transmission time may become more significant if the spoofer 340 is airborne.

Because jitter is at the heart of being able to determine which signals may be real, for example, come from GNSS satellites 320, 330, as opposed to those from the spoofer 340, it may be beneficial to artificially generate jitter in the motion of the vehicle 300. In accordance with various embodiments of the present invention, this artificial jitter may be created any number of ways depending, in part, upon the type of vehicle 300. For example, with many different types of vehicles 300, the jitter may be created by changing engine speed causing a corresponding change in the speed of the vehicle 300. These changes in engine speed are preferably rapid, as this will make detection by the spoofer 340 even more difficult. Other artificial platform jitter sources could include, for example, intentional changes in altitude, roll, pitch, or yaw by altering various flight control surfaces, subject to various operational constraints, if the vehicle 300 is an airborne platform. In other embodiments of the present invention, the artificial jitter may be directed to the receiver 310 rather than the vehicle 300 carrying the receiver 310. In these cases, artificial jitter can be introduced even if the vehicle 300 is motionless or traveling at a perfectly constant speed, making detection by the spoofer 340 virtually impossible. Such receiver jitter could be introduced, for example, by changing the location or attitude of the receiver 310 with respect to the coordinate frame of the vehicle 300. As an exemplary implementation, the receiver 310, or at least its antenna, could be placed in a tube and moved back and forth within the tube. In each case, this artificial vehicle jitter is preferably large enough to be readily detected by an onboard IMU sensor, for example, a MEMS accelerometer, but small enough that it is not detected by the spoofing system.

In a sophisticated attack, a vehicle-tracking spoofer may compensate for the target vehicle's motion with respect to satellite position (e.g., a spoofer that knows how to compensate for the above-described jitter correlation or multiple spoofers positioned intelligently as in the case of a spoofer network). In various embodiments of the present invention, the spoofer survivability algorithm can correlate falsified GNSS signal differences with an on-board INS and a carrier-phase differential GNSS system, thereby more accurately measuring both receiver location and jitter effects on pseudo-range and Doppler than that detectable by the vehicle-tracking spoofer. With this approach, various embodiments of the present invention can correlate out the falsified GNSS signals from the true GNSS signals even under spoofing scenarios where the spoofer has accurate knowledge of the target vehicle's location.

Algorithms

Figure 15:
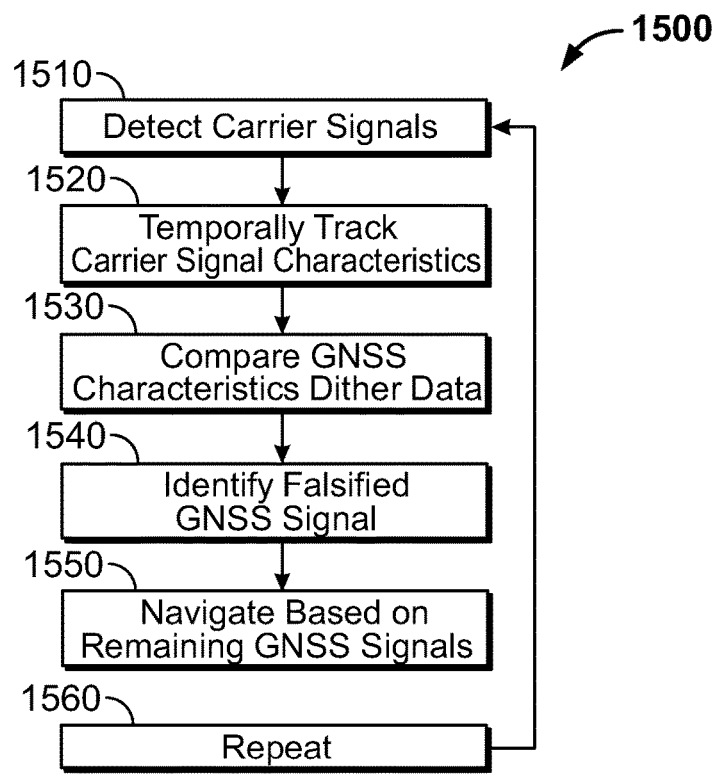
FIGS. 15-19 are flowcharts illustrating spoofer survivability algorithms in accordance with various embodiments of the present invention.

In at least one embodiment of the present invention, the spoofer survivability algorithm 1500 includes the steps illustrated in FIG. 15. In step 1510, the algorithm 1500 detects multiple carrier signals. In step 1520, the characteristics of the detected carrier signals are temporally tracked for dithering, resulting in GNSS characteristic dither data. In step 1530, the GNSS characteristic dither data is compared between and among the multiple carrier signals. If two or more carrier signals result in substantially the same GNSS characteristic dither data, i.e., they are highly correlated, then these highly correlated carrier signals are identified as falsified GNSS signals in step 1540 and no longer tracked. In step 1550, subsequent navigation is based upon the remaining carrier signals. The overall process is repeated as needed in step 1560.

Figure 16:
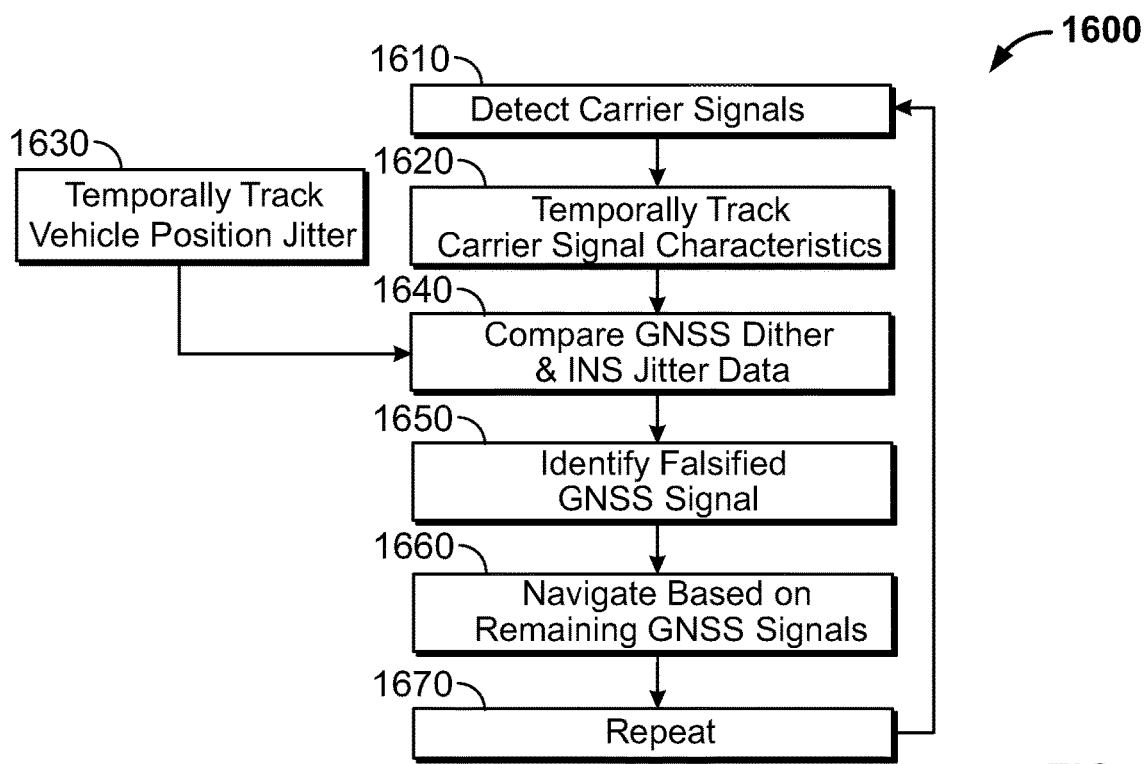

In embodiments of the present invention used in conjunction with vehicles having an on-board INS, the corresponding spoofer survivability algorithm 1600 includes the steps illustrated in FIG. 16. In step 1610, the algorithm 1600 detects multiple carrier signals. In step 1620, the characteristics of the detected carrier signals are temporally tracked for dithering, resulting in GNSS characteristic dither data. Concurrently with step 1620, the INS temporally tracks jitter of the vehicle, resulting in INS jitter data in step 1630. In step 1640, the GNSS characteristic dither data is compared with the corresponding INS jitter data. If one (or more) of the carrier signals does not result in substantially the same GNSS dither data as the INS jitter data, i.e., the GNSS dither data and the INS jitter data are not highly correlated, the highly uncorrelated carrier signal is identified as a falsified GNSS signal in step 1650 and no longer tracked. In step 1660, subsequent navigation is based upon the remaining carrier signals. The overall process is repeated as needed in step 1670.

The correlation of a falsified GNSS signal will pose a challenge when considering only jitter in vehicle position, because the noise signals to be correlated are small. Looking at noise along only specific frequency channels, such as through polyphase-domain multi-rate signal processing tactics, further improves the correlation abilities for these signals. However, additional tactics already present in various integrity monitoring algorithms can help identify falsified GNSS signals by looking at, for example, expected clock information (related to pseudo-range), clock bias and clock drift, dual-channel reception (measuring signals across multiple frequencies), Doppler shift between multiple frequencies of signal reception, signal strength, and angle of arrival.

Figure 17:
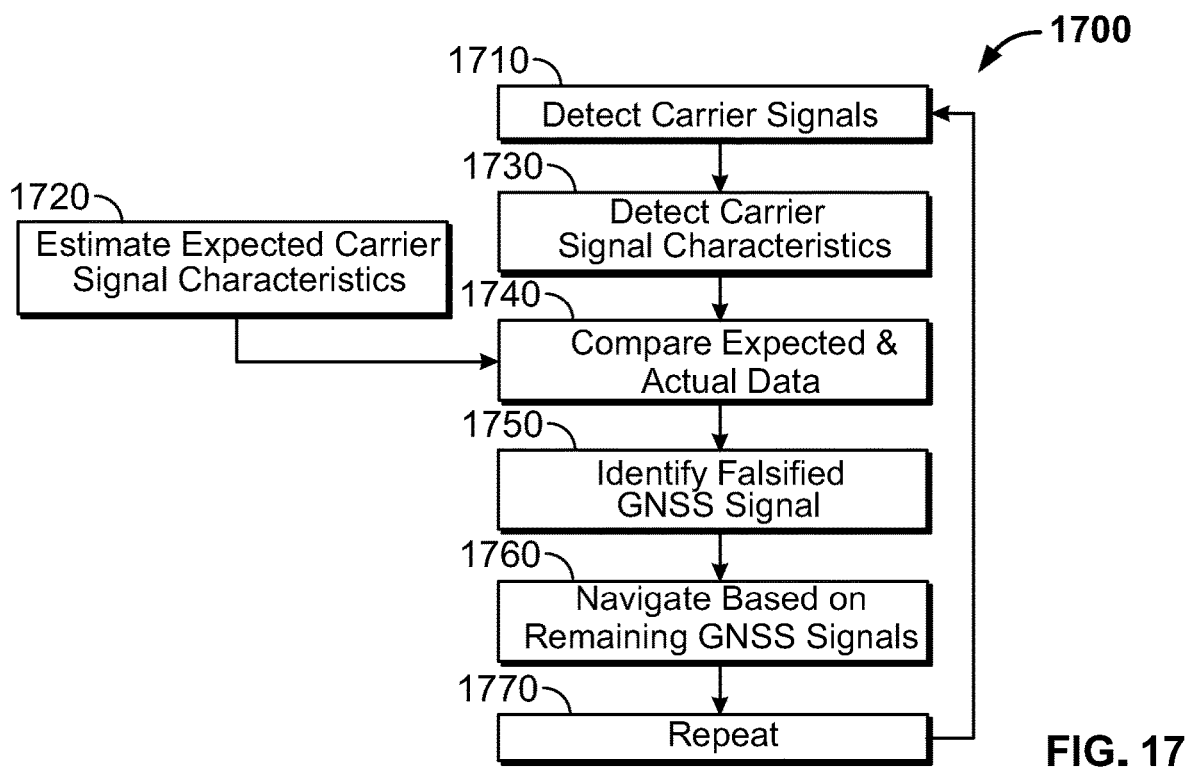

In at least some embodiments of the present invention used in conjunction with systems having integrity monitoring algorithm(s), the corresponding spoofer survivability algorithm 1700 includes the steps illustrated in FIG. 17. In step 1710, the algorithm 1700 detects multiple carrier signals. In step 1720, the integrity monitoring algorithm(s) estimates expected values for one or more characteristics for each of the detected carrier signals, resulting in expected GNSS data. In step 1730, the algorithm 1700 detects the one or more characteristics of the multiple carrier signals, resulting in actual GNSS data. In step 1740, the expected GNSS data is compared with the corresponding actual GNSS data. If the expected GNSS data for one (or more) of the carrier signals does not have substantially the same value as the actual GNSS data, i.e., the expected GNSS data and the actual GNSS data are not highly correlated, the highly uncorrelated carrier signal is identified as a falsified GNSS signal in step 1750 and no longer tracked. In step 1760, subsequent navigation is based upon the remaining carrier signals. The overall process is repeated as needed in step 1770.

If a receiver can continue to navigate through a spoofer scenario, it is able to correlate out the vector of the vehicle position jitter along-track to the spoofer. This means the vehicle should be able to triangulate on the location of the spoofer, i.e., the source (transmitter) of the falsified GNSS signal, which, depending upon the application, may in itself be valuable information. As will be appreciated by those of ordinary skill in the art, by employing more than one antenna, the accuracy of the triangulation to the source of the falsified GNSS signal will improve.

If the vehicle knows where it is and also knows the fixed location of the spoofer, it should be possible to utilize the spoofer signal for additional pseudo-range measurements. This effectively turns the spoofer transmitter into a pseudolite (a contraction of the term "pseudo-satellite," used to refer to something that is not a satellite, but that implements a function commonly performed by a satellite). This increases navigational capabilities beyond GNSS-navigation alone in the presence of spoofing. See, for example, M. Jones, "Army pseudolites: What, why and how," GPS World (www.gpsworld.com) (2017), the contents of which are incorporated herein by reference, for a discussion of pseudolites. In the case of a spoofer attack that uses a network of strategically located spoofer transmitters, navigation accuracy could be further improved due to the effectively increased number of pseudo-range/Doppler measurements available to the receiver. In effect, the more sophisticated a spoofer attack, the better the navigation that can be accomplished.

Figure 18:
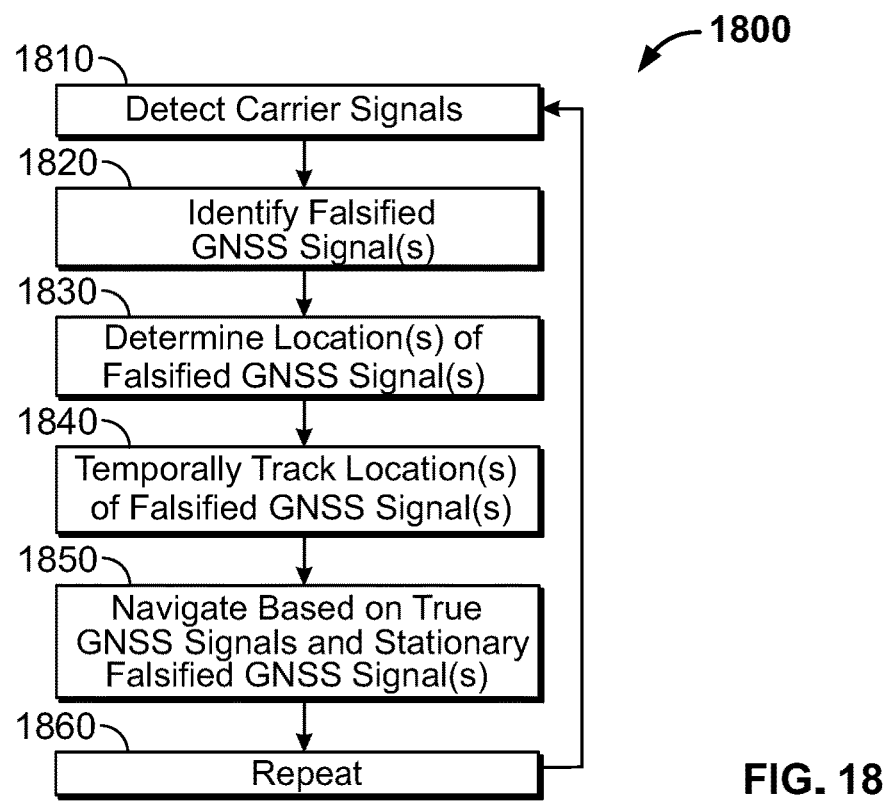

In embodiments of the present invention that turn the spoofer transmitter into a pseudolite-like system, the corresponding spoofer survivability algorithm 1800 includes the steps illustrated in FIG. 18. In step 1810, the algorithm 1800 detects multiple carrier signals. In step 1820, the algorithm 1800 identifies which of the multiple carrier signals is a falsified GNSS signal, using, for example, one of the previously described algorithms. In step 1820, the algorithm 1800 may identify more than one falsified GNSS signals if a spoofer network of multiple transmitters is being employed. In step 1830, the algorithm 1800 determines the location(s) of the transmitter(s), i.e., pseudolite(s), corresponding to the one or more falsified GNSS signals via triangulation. In step 1840, the algorithm 1800 temporally tracks the location(s) of the transmitter(s) corresponding to the one or more falsified GNSS signals to determine if the transmitter(s) are moving or not. In step 1850, the algorithm 1800 employs the one or more falsified GNSS signals when their corresponding transmitter(s) are stationary, in conjunction with the GNSS signals that are not falsified, for navigation purposes. The one or more stationary falsified GNSS signal(s) thereby effectively become "unfalsified" GNSS signals, i.e., pseudolite-like signals, and thus may be used to better determine the location of the receiver for navigation purposes. The process is repeated in step 1860.

Figure 19:
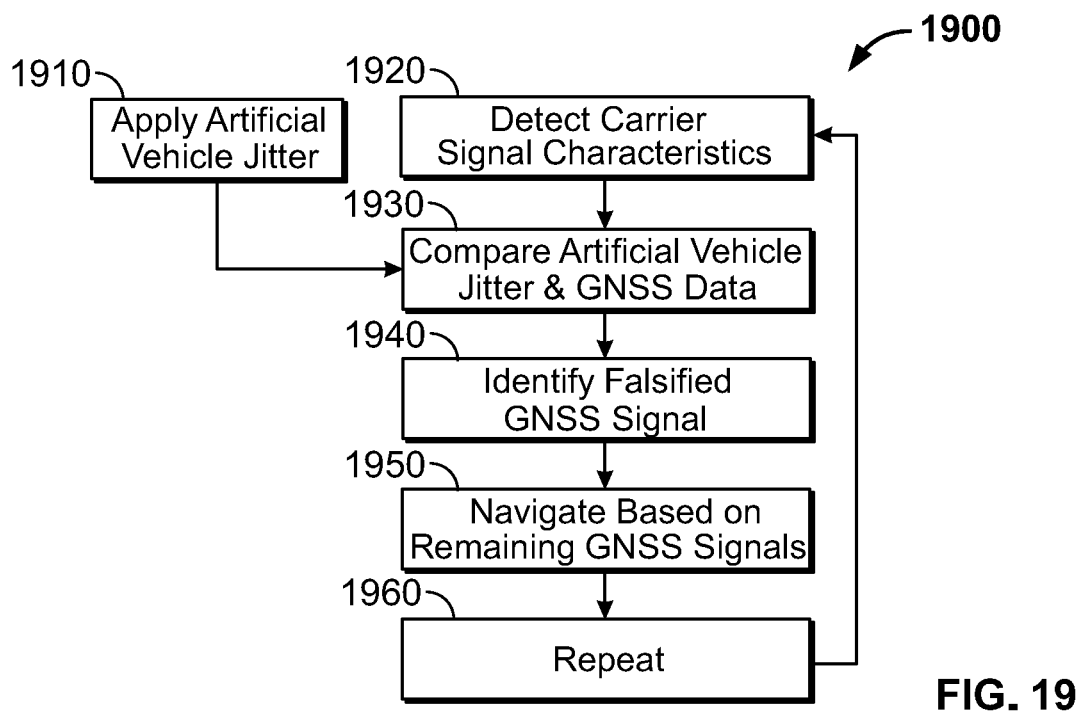

In embodiments of the present invention used in conjunction with artificial vehicle jitter, the corresponding spoofer survivability algorithm 1900 includes the steps illustrated in FIG. 19. In step 1910, artificial jitter is applied to the vehicle, which may, for example, be measured by an onboard INS, resulting in artificial vehicle jitter data. In step 1920, and in parallel with step 1910, the algorithm 1900 detects the characteristics of multiple carrier signals, resulting in GNSS characteristic data. In step 1930, the GNSS characteristic data is compared to the artificial vehicle jitter data. If the GNSS characteristic data for one (or more) of the carrier signals does not reflect the artificial vehicle jitter data, i.e., the GNSS characteristic data and the artificial vehicle jitter data are not highly correlated, the highly uncorrelated carrier signal is identified as a falsified GNSS signal in step 1940 and no longer tracked. In step 1950, subsequent navigation is based upon the remaining carrier signals, i.e., those that track the artificial vehicle jitter. The overall process is repeated as needed in step 1960.

In certain embodiments of the present invention employing artificial vehicle jitter, the GNSS receiver is interconnected with the vehicle controls. For example, the GNSS receiver is interconnected with the vehicle's engine or drivetrain management system to enable altering the power output by the vehicle's drivetrain or by altering the vehicle's speed. As another example, the GNSS receiver is interconnected with the vehicle's flight control surfaces management system to enable altering the position of the control surfaces leading, for example to changes in the vehicle's altitude, roll, pitch, or yaw. In each of these cases, altering the power output, vehicle speed, control surfaces, and altitude should be the minimum required for reliable detection by the onboard INS.

In other scenarios, the spoofer may attempt to actively drown out the true GNSS signal, hiding it below the noise floor. Although such spoofer attacks are readily detected using various integrity monitoring algorithms, including, for example, RAIM algorithms, such an attack would prevent proper navigation because the true signal could no longer be detected. However, new GNSS signal types, for example the civilian GPS L5 signal and the military M-code encoded GPS signals, are sufficiently wide in bandwidth that the strain on spoofers to generate sufficient power to drown out the true GNSS signal will be very challenging. In addition, given INS tightly-coupled navigation and sufficient artificial vehicle jitter techniques, it may be possible to properly navigate using certain information from the spoofer's falsified GNSS signal, and in particularly the changes relative to geometry due to artificial vehicle jitter. In short, with one or more embodiments of the present invention, one could navigate using the falsified GNSS signal itself, even if the true GNSS signal is lost.

Figure 20:
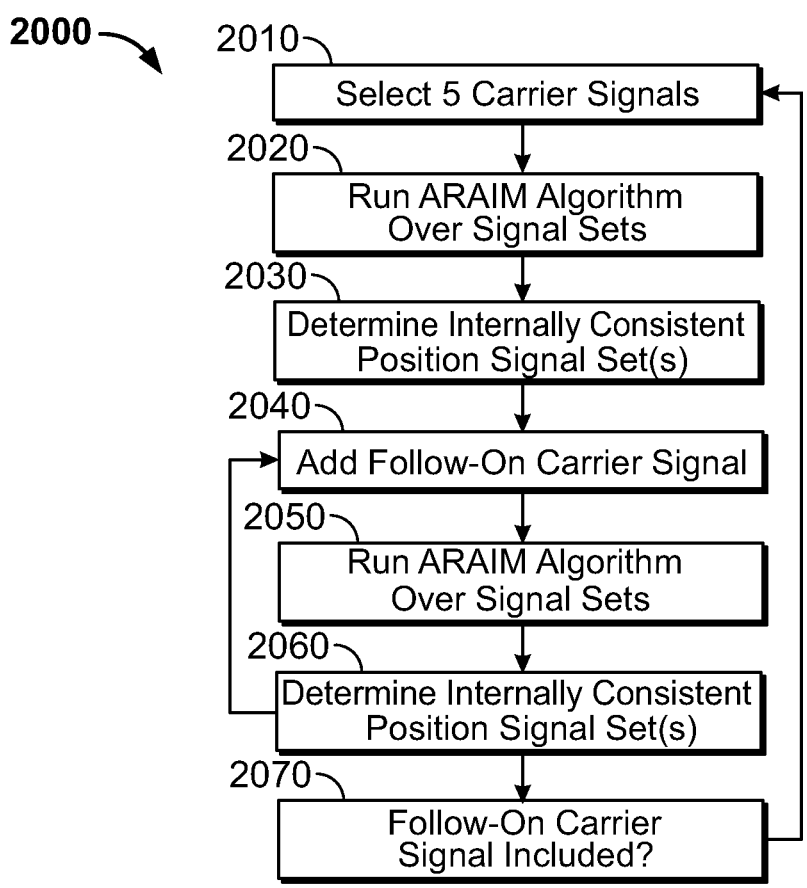
FIG. 20 is a flowchart illustrating a constellation binning algorithm in accordance with various embodiments of the present invention.
Figure 21:
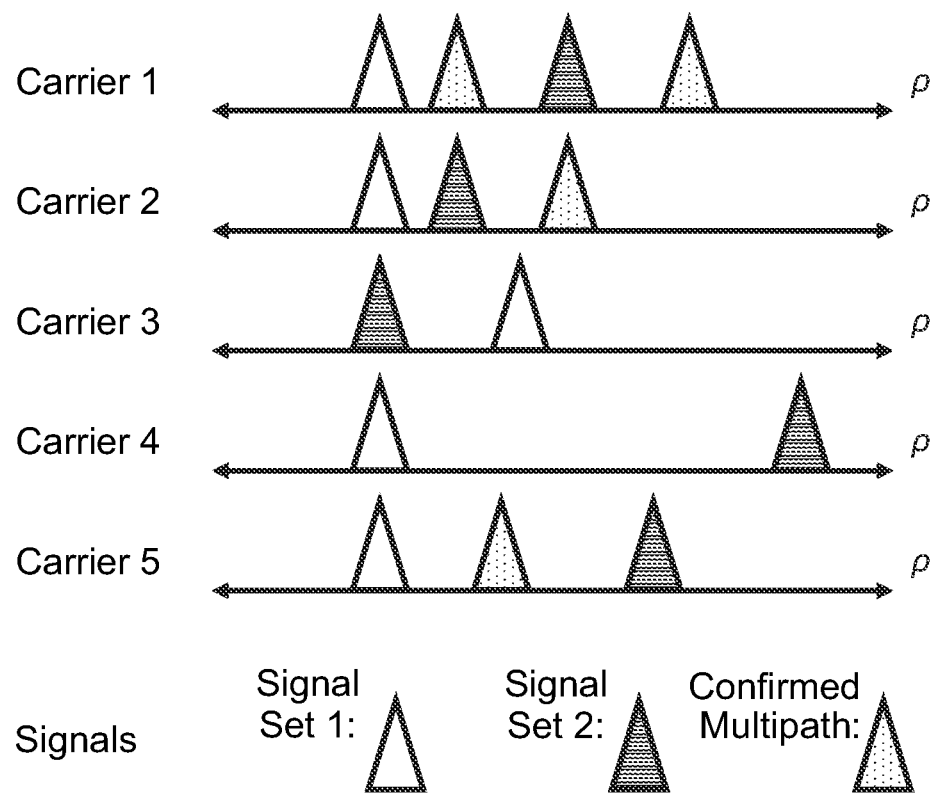
FIG. 21 illustrates sets and subsets of carrier signals as used in the constellation binning algorithm in accordance with various embodiments of the present invention.

In other embodiments of the present invention, a constellation binning algorithm 2000, illustrated in FIG. 20, is included. In step 2010, subsets of carrier signals are selected based on characteristics of all signals purporting to be the same carrier in the set. In step 2020, a cost function is used to evaluate the consistency of each possible signal set (as illustrated in FIG. 21). The detected carrier signals, and their corresponding signal source data, will comprise true GNSS carrier signals, falsified GNSS carrier signals, and multipath signals, i.e., "echoes" of true GNSS carrier signals or falsified GNSS carrier signals. Signal sets are defined as consistent if the purported signal solution does not have outlier pseudoranges that increase the variance of the purported position solution. A subset of carrier signals that form a solution set and are considered to be self-consistent are considered to be either intentionally falsified signals or the true position solution. Signals of a self-consistent set may then be labeled and further compared to dither data or evaluated through other anti-spoofing algorithms to determine which self-consistent signal sets are false and which self-consistent signal set corresponds to the true GNSS satellite signals. The signal sets may occasionally be re-evaluated to respond to events whereby false and true correlator peaks may overlap or cross one another. This general process can also be performed by taking advantage of existent ARAIM algorithms to define a cost function and outlier rejection.

In the ARAIM-leveraging constellation binning case, corresponding ARAIM algorithms are run over all signal sets for five carrier signals. The ARAIM algorithm performs outlier detection by determining if a signal set produces an internally consistent position. A signal set that includes only true carrier signals or only falsified carrier signals will produce an internally consistent position. A signal set that includes a mix of true carrier signals and falsified carrier signals will not produce an internally consistent position. As will be appreciated by those of ordinary skill in the art, the ARAIM algorithm assumes that only one of the GNSS signals is not a true carrier signal. As such, the ARAIM algorithm identifies a single outlier among the carrier signals as the remaining carrier signals in the signal set produce an internally consistent position. In contrast, the present invention may operate in scenarios with multiple falsified carrier signals. For this reason, the ARAIM algorithm cannot identify a single outlier in the signal set as two falsified carrier signals mean no internally consistent position can be determined. In step 2030, the signal sets that produce internally consistent positions are determined, which correspond to signal sets of either all true carrier signals or all falsified carrier signals. In step 2040, a follow-on carrier signal from each additional GNSS satellite in view (or coming into view) is added to each of the signal sets that produced an internally consistent position. In step 2050, corresponding ARAIM algorithms are run over all internally consistent position signal sets from step 2030 to which a follow-on GNSS signal has been added in step 2040. In step 2060, the signal sets with a follow-on carrier signal that produce internally consistent positions are determined. Steps 2040 through 2060 are periodically repeated. In step 2070, if the follow-on carrier signal is not included in at least one of the signal sets with a follow-on carrier signal that produces an internally consistent position as determined in step 2060, then the entire algorithm, starting with step 2010, is repeated. To minimize the computational burden of the previously described algorithms, i.e., algorithms 1500-1900, only those signal sets that produce internally consistent positions in algorithm 2000 need be processed.

The above description of various embodiments of the present invention generically refers to the Global Navigation Satellite System (GNSS). Various embodiments of the present invention operate with one or more specific GNSS signals. GNSS includes, for example, BeiDou Navigation Satellite System (owned by the People's Republic of China), Galileo (owned by the EU), GLONASS (owned by the Russian Federation), Indian Regional Navigation Satellite System (or Navigation Indian Constellation) (owned by India), Global Positioning System (owned by the US), and the Quasi-Zenith Satellite System (owned by Japan).

Applications

While the above discussion focused primarily on successfully operating in a spoofed environment, the application of spoofing may have even more nefarious applications. For example, if the operator of a vehicle is not aware that the GNSS signals being followed have been spoofed, the operator can readily be misdirected, resulting the vehicle essentially being hijacked to travel in the spoofer desired direction. While such hijacking might readily be applied to high value targets, such as airplanes or cargo ships and tankers, it might also be applied to autonomous vehicles of all kinds. While autonomous vehicles will not rely entirely on GNSS signals for location, those signals will undoubtedly play a role. It is easy to imagine the havoc that could be created when the guidance system of an autonomous vehicle gets conflicting information from different sources.

Embodiments

In one or more embodiments, the present invention may take the form of a method for detecting and countering the spoofing of GNSS signals. In one or more other embodiments, the present invention may take the form of a system implementing a method for detecting and countering the spoofing of GNSS signals. In one or more additional embodiments, the present invention may take the form of a computer-readable storage device with instructions for implementing a method for detecting and countering the spoofing of GNSS signals. Note that a propagated signal is not included within the scope of a computer-readable storage device.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising the steps of:
   detecting a plurality of Global Navigation Satellite System (GNSS) carrier signals;
   temporally tracking characteristics of the plurality of GNSS carrier signals for dither, thereby creating dither data;
   comparing the dither data;
   identifying at least one falsified GNSS carrier signal based upon a degree of correlation of the dither data;
   temporally tracking the plurality of GNSS carrier signals, thereby creating signal source data;
   filtering the signal source data to remove multipath signals;
   binning the remaining signal source data into signal sets; and
   determining one or more signal sets that produce a corresponding internally consistent position according to a cost function based on a consistency of a corresponding position, wherein each one of the determined signal sets corresponds to falsified GNSS carrier signals or true satellite-transmitted GNSS carrier signals;
   wherein further processing of each of the one or more signal sets that produce a corresponding internally consistent position identifies which internally consistent position is based upon falsified GNSS carrier signals; and
   determining navigation information based on the plurality of GNSS carrier signals not identified as falsified GNSS carrier signals.

2. The method of claim 1, wherein when the dither data from the characteristics of two or more of the plurality of GNSS carrier signals are highly correlated, the corresponding two or more of the plurality of GNSS carrier signals are identified as falsified GNSS carrier signals.

3. The method of claim 1, further comprising the steps of:
   detecting jitter of a vehicle;
   temporally tracking the jitter of the vehicle, thereby creating jitter data;
   comparing dither data with jitter data; and
   identifying at least one falsified GNSS carrier signal based upon a degree of correlation of the dither data and the jitter data, wherein when the dither data from the characteristics of one of the plurality of GNSS carrier signals is not highly correlated with the jitter data, the corresponding one of the plurality of GNSS carrier signals is identified as the falsified GNSS carrier signal.

4. The method of claim 3, further comprising the step of introducing artificial jitter to the vehicle, the step of introducing artificial jitter prior to the step of detecting jitter.

5. The method of claim 4, wherein the step of introducing artificial jitter includes at least one of changing an engine speed of the vehicle, changing a speed of the vehicle, changing an altitude of the vehicle, changing a roll of the vehicle, changing a pitch of the vehicle, changing a yaw of the vehicle, changing a flight control surface of the vehicle, or changing a location or attitude of an antenna of a receiver used in the step of detecting a plurality of GNSS carrier signals with respect to a vehicle coordinate frame.

6. The method of claim 1, further comprising the steps of:
estimating expected values for one or more characteristics of the plurality of GNSS carrier signals, thereby creating expected data;
detecting one or more actual characteristics of the plurality of GNSS carrier signals, thereby creating actual data;
comparing the expected data with the actual data; and
identifying at least one falsified GNSS carrier signal based upon a degree of correlation of the expected data with the actual data, wherein when the actual data is not highly correlated with a corresponding one of the expected data, the one of the plurality of GNSS carrier signals corresponding to the actual data that is not highly correlated is identified as the falsified GNSS carrier signal.

7. The method of claim 1, further comprising the steps of:
determining a respective location of a transmitter corresponding to each of the at least one falsified GNSS carrier signal;
temporally tracking the respective location of the transmitter corresponding to each of the at least one falsified GNSS carrier signal;
identifying, as a stationary transmitter, each transmitter whose respective location does not temporally change;
identifying, as a stationary falsified GNSS carrier signal, each of the at least one falsified GNSS carrier signal corresponding to a stationary transmitter; and
determining navigation information based on each stationary falsified GNSS carrier signal.

8. A system comprising:
an antenna for detecting a plurality of Global Navigation Satellite System (GNSS) carrier signals;
at least one processor; and
memory that stores instructions that, when executed by the at least one processor, cause the at least one processor to perform acts including:
temporally tracking characteristics of the plurality of GNSS carrier signals for dither, thereby creating dither data;
comparing the dither data;
identifying at least one falsified GNSS carrier signal based upon a degree of correlation of the dither data;
temporally tracking the plurality of GNSS carrier signals, thereby creating signal source data;
filtering the signal source data to remove multipath signals;
binning the remaining signal source data into signal sets; and
determining one or more signal sets that produce a corresponding internally consistent position according to a cost function based on a consistency of a corresponding position, wherein each one of the determined signal sets corresponds to falsified GNSS carrier signals or true satellite-transmitted GNSS carrier signals;
wherein further processing of each of the one or more signal sets that produce a corresponding internally consistent position identifies which internally consistent position is based upon falsified GNSS carrier signals; and
determining navigation information based on the plurality of GNSS carrier signals not identified as falsified GNSS carrier signals.

9. The system of claim 8, wherein when the dither data from the characteristics of two or more of the plurality of GNSS carrier signals are highly correlated, the corresponding two or more of the plurality of GNSS carrier signals are identified as falsified GNSS carrier signals.

10. The system of claim 8, wherein the memory stores instructions that, when executed by the at least one processor, cause the at least one processor to perform further acts including:
detecting jitter of a vehicle, the vehicle including the antenna;
temporally tracking the jitter of the vehicle, thereby creating jitter data;
comparing dither data with jitter data; and
identifying at least one falsified GNSS carrier signal based upon a degree of correlation of the dither data and the jitter data, wherein when the dither data from the characteristics of one of the plurality of GNSS carrier signals is not highly correlated with the jitter data, the corresponding one of the plurality of GNSS carrier signals is identified as the falsified GNSS carrier signal.

11. The system of claim 10,
further comprising means for introducing artificial jitter to the vehicle;
wherein the artificial jitter includes at least one of changing an engine speed of the vehicle, changing a speed of the vehicle, changing an altitude of the vehicle, changing a roll of the vehicle, changing a pitch of the vehicle, changing a yaw of the vehicle, changing a flight control surface of the vehicle, or changing a location or attitude of the antenna with respect to a vehicle coordinate frame.

12. The system of claim 8, wherein the memory stores instructions that, when executed by the at least one processor, cause the at least one processor to perform further acts including:
determining a respective location of a transmitter corresponding to each of the at least one falsified GNSS carrier signal;
temporally tracking the respective location of the transmitter corresponding to each of the at least one falsified GNSS carrier signal;
identifying, as a stationary transmitter, each transmitter whose respective location does not temporally change;
identifying, as a stationary falsified GNSS carrier signal, each of the at least one falsified GNSS carrier signal corresponding to a stationary transmitter; and
determining navigation information based on each stationary falsified GNSS carrier signal.

13. A computer-readable storage device comprising instructions that, when executed by at least one processor, cause the at least one processor to perform acts comprising:
detecting a plurality of Global Navigation Satellite System (GNSS) carrier signals;
temporally tracking characteristics of the plurality of GNSS carrier signals for dither, thereby creating dither data;
comparing the dither data;
identifying at least one falsified GNSS carrier signals based upon a degree of correlation of the dither data;

temporally tracking the plurality of GNSS carrier signals, thereby creating signal source data;

filtering the signal source data to remove multipath signals;

binning the remaining signal source data into signal sets; and determining one or more signal sets that produce a corresponding internally consistent position, wherein each one of the determined signal sets corresponds to falsified GNSS carrier signals or true satellite-transmitted GNSS carrier signals according to a cost function based on a consistency of a corresponding position;

wherein further processing of each of the one or more signal sets that produce a corresponding internally consistent position identifies which internally consistent position is based upon falsified GNSS carrier signals; and determining navigation information based on the plurality of GNSS carrier signals not identified as falsified GNSS carrier signals.

14. The computer-readable storage device of claim 13, wherein when the dither data from the characteristics of two or more of the plurality of GNSS carrier signals are highly correlated, the corresponding two or more of the plurality of GNSS carrier signals are identified as falsified GNSS carrier signals.

15. The computer-readable storage device of claim 13, wherein the acts further comprise:

detecting jitter of a vehicle;

temporally tracking the jitter of the vehicle, thereby creating jitter data;

comparing dither data with jitter data; and identifying the at least one falsified GNSS carrier signal based upon a degree of correlation of the dither data and the jitter data, wherein when the dither data from the characteristics of one of the plurality of GNSS carrier signals is not highly correlated with the jitter data, the corresponding one of the plurality of GNSS carrier signals is identified as the falsified GNSS carrier signal.

16. The computer-readable storage device of claim 15, wherein the acts further comprise introducing artificial jitter to the vehicle; and wherein the artificial jitter includes at least one of changing an engine speed of the vehicle, changing a speed of the vehicle, changing an altitude of the vehicle, changing a roll of the vehicle, changing a pitch of the vehicle, changing a yaw of the vehicle, changing a flight control surface of the vehicle, or changing a location or attitude of an antenna of a receiver used in the step of detecting a plurality of GNSS carrier signals with respect to a vehicle coordinate frame.

17. The computer-readable storage device of claim 13, wherein the acts further comprise:

determining a respective location of a transmitter corresponding to each of the at least one falsified GNSS carrier signal;

temporally tracking the respective location of the transmitter corresponding to each of the at least one falsified GNSS carrier signal;

identifying, as a stationary transmitter, each transmitter whose respective location does not temporally change;

identifying, as a stationary falsified GNSS carrier signal, each of the at least one falsified GNSS carrier signal corresponding to a stationary transmitter; and determining navigation information based on each stationary falsified GNSS carrier signal.

* * * * *